United States Patent
Jin et al.

(10) Patent No.: US 12,039,008 B1
(45) Date of Patent: Jul. 16, 2024

(54) DATA GENERATION AND STORAGE SYSTEM

(71) Applicant: Zoox, Inc., Foster City, CA (US)

(72) Inventors: Shen Jin, Palo Alto, CA (US);
Bharadwaj Raghavan, Sunnyvale, CA (US)

(73) Assignee: ZOOX, INC., Foster City, CA (US)

( * ) Notice: Subject to any disclaimer, the term of this patent is extended or adjusted under 35 U.S.C. 154(b) by 419 days.

(21) Appl. No.: 17/362,718

(22) Filed: Jun. 29, 2021

(51) Int. Cl.
| | |
|---|---|
| *G06F 18/214* | (2023.01) |
| *G06F 3/08* | (2006.01) |
| *G06F 11/34* | (2006.01) |
| *G06F 16/18* | (2019.01) |

(52) U.S. Cl.
CPC ............ *G06F 18/2148* (2023.01); *G06F 3/08* (2013.01); *G06F 11/3476* (2013.01); *G06F 16/1873* (2019.01)

(58) Field of Classification Search
CPC .... G06F 18/214; G06F 18/211; G06F 18/217; G06F 11/3476; G06N 5/01; G06N 20/00; G06N 3/08; B60W 50/04
See application file for complete search history.

(56) References Cited

U.S. PATENT DOCUMENTS

| | | | | |
|---|---|---|---|---|
| 2019/0308620 | A1* | 10/2019 | Sapp | G01S 13/86 |
| 2020/0004255 | A1* | 1/2020 | Mohammadiha | B60W 50/04 |
| 2020/0160559 | A1* | 5/2020 | Urtasun | G06T 7/55 |
| 2020/0209858 | A1* | 7/2020 | Trofymov | G06N 3/045 |
| 2020/0410288 | A1* | 12/2020 | Capota | G06F 21/6245 |

* cited by examiner

*Primary Examiner* — Margaret G Mastrodonato
(74) *Attorney, Agent, or Firm* — Lee & Hayes P.C.

(57) ABSTRACT

Techniques for managing data associated with different versions of components over time by a computing system are discussed herein. The computing system can generate, store, and/or delete data associated with different versions of components having a hierarchical relationship such that data can be fed from one component to another component over time). The computing system can receive log data associated with one or more components and determine regeneration data for different components of a vehicle computing device over time. The computing system can include a user interface for receiving file generation requests to test, validate, or verify functionality of a particular component of the vehicle computing device at different instances of time.

20 Claims, 7 Drawing Sheets

DATA GENERATION AND STORAGE SYSTEM

BACKGROUND

Machine learning algorithms such as neural networks are often trained to perform a task by considering training data. For example, image data that has been previously associated with a classification may be fed into a neural network to train the neural network to recognize the classification. However, training the neural network can affect outputs from other neural networks that receive input data from the trained neural network. In addition, determining which data to train a neural network can be challenging as the amount of available data for training increases over time and storing all data is not always possible due to limited available storage.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
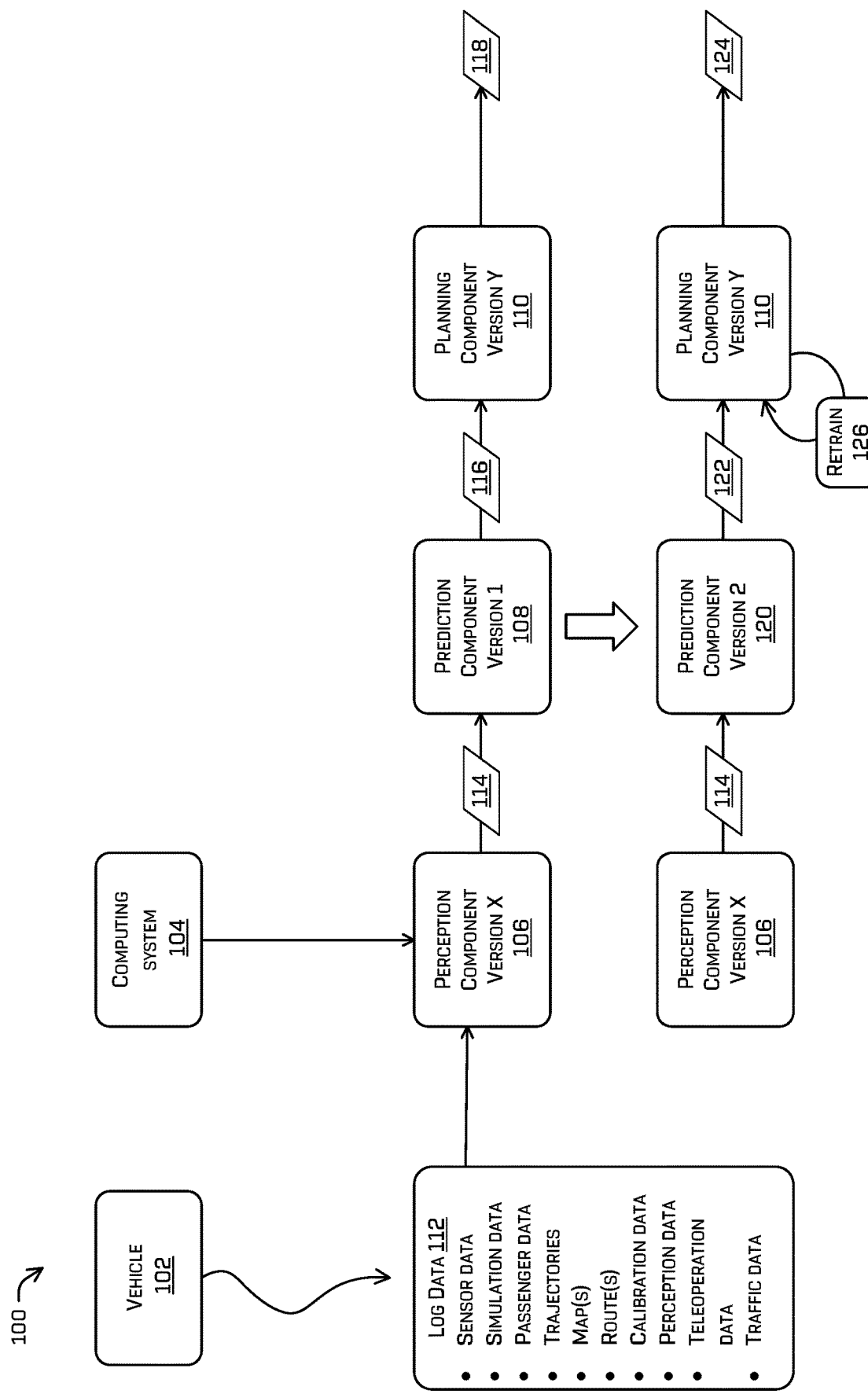
FIG. 1 is an illustration of an example environment in which an example computing system generates training data associated with an example component.

This application is directed to a computing system that manages data associated with different versions of components over time. For example, a version of components associated with an autonomous vehicle controller can change over time, and the computing system can generate, store, and/or delete data associated with different versions of each component. In some instances, data from one component can be used as an input to another component such that a change in a version of one component can necessitate an update to other downstream component(s). The computing system can receive data (e.g., log data) associated with one or more components and generate training data to train the one or more components. In various examples, the computing system can receive requests for training data and format or configure a job that identifies which components require updated training data based on a hierarchy, or relationship, among the components. For example, when a version of a component is updated, the computing system can identify, initiate, and generate training data for other downstream components to ensure that each component of an autonomous vehicle controller is trained with the most recent and/or most useful data.

Generally, the computing system can provide functionality to determine regeneration data based on log data representing actions or behavior of a vehicle navigating in a simulated environment and/or a real-world environment. The log data can include sensor data from one or more sensors coupled to the vehicle, simulation data from a simulation involving the vehicle, file data (e.g., data chunks representing messages over time), just to name a few. For example, the computing system may receive log data associated with a component of a vehicle computing device and determine regeneration data (e.g., data associated with a file version, component data, etc.) for a same or different component of the vehicle computing device. In various examples, the computing system can generate a job for processing by a central pipeline processor that processes the log data and returns data usable to train or otherwise improve the accuracy of a result by the component associated with the log data.

The computing system can, for instance, receive a job request via a user interface that identifies a start time, and end time, and a component associated with a vehicle that operates in a simulated environment or a real-world environment. In such examples, the computing system can determine which other component(s) in a hierarchy of components are affected by a change to a version of the component associated with the request (as a result of training, for instance). In this way, data can be sent to a machine learned model (e.g., a centralized pipeline processor) that processes the data to determine or otherwise generate training data specific for a given version of the components. The computing system can share the generated training data with each respective component to improve operation of the components (e.g., test, validate, or verify functionality of a particular component of the autonomous vehicle controller), including a component that is downstream and otherwise not included in the job request. In this way, the computing system can be used to improve safety of a vehicle controlled by a vehicle computing device associated with the autonomous vehicle controller as the vehicle navigates in an environment (e.g., the simulated environment and/or the real-world environment).

By way of example and not limitation, a perception component (also referred to as a sensor component) configured to perceive an area around an autonomous vehicle may receive image data from one or more sensors coupled to the autonomous vehicle, and determine a bounding box(es) representing an object(s) in the area. The image data may be passed from the perception component to a prediction component that determines a potential action by the object and/or the autonomous vehicle. In such examples, when the image data is updated for the perception component over time, data input to the prediction component may no longer be valid for use in determining predictions. The computing system can determine when data (e.g., image data, training data, and so on) has been regenerated for the perception component and regenerate data usable by the prediction component to perform predictions and/or to train the prediction component. In this manner, the computing system can determine file version data and/or training data to train respective components even when changes are only initiated for one component in a hierarchical relationship thereby ensuring that each component is operating on a latest version of available data.

Using the computing system as described herein, less data can be stored for each component in a hierarchy of components and requests to update a version of a component can be made without requiring a user to understand how the components are related. For example, a request to generate training data for a component may identify 20,000 log files representing vehicle behavior over a certain timeframe, and the computing system can identify whether a previous job request having some of the same log files have already been processed thereby saving computational resources to process all of the log files associated with the request. By "re-using" some log files from a file store that have already processed, training data for the component can be generated in less time versus processing all the 20,000 log files.

In another example, a first user may provide input to a user interface associated with the computing system indicating a first request for training data to train a prediction component and a second user may provide input to the user interface indicating a second request to train a planning component downstream from the prediction component. In this example, the planning component may be configured to determine an action, a route, and/or a trajectory for a vehicle based on predictions received from the prediction component (e.g., the planning component is related to the prediction component by receiving data as input from the prediction component). In such examples, the computing system can identify log files associated with the first request and log files associated with the second request that are in common, and prevent duplication of storage and/or processing of the common log files to more efficiently determine version data for the prediction component and the planning component. For instance, if 8,000 log files are in common with both requests, the computing system can process 20,000 log files for the first request and 12,000 for the second request, and return links of the respective version data for output by the user interface to the first user and the second user. Accordingly, the first user and second user can receive a result of their respective request more quickly and independent of whether the first user and the second user are associated with different teams responsible to train different components.

To further illustrate the data managing techniques described herein, consider a scenario in which a vehicle computing device controls an autonomous vehicle (e.g., controls a steering action, a braking action, an acceleration action, and so on) relative to another object, such as another vehicle, pedestrian, bicyclist, and the like. In such examples, the vehicle computing device can generate log data describing how the vehicle responds to the object. The computing system can receive the log data describing how the autonomous vehicle behaves (e.g., how the vehicle perceived the environment using a perception component, how the vehicle predicts future actions of the object by a prediction component, and/or how the vehicle plans a trajectory for the vehicle to follow to avoid the object by a planning component, just to name a few). By processing the log data in a variety of ways as described herein, the computing system can generate file version data, component data, and/or training data that can be referred to collectively as "regeneration data". The regeneration data may be generated by a machine learned model that processes the log data in parallel for faster production. In some examples, the computing system can organize how the log data is to be processed (e.g., generate common scripts) by the machine learned model, and provide an indication of the progress of the regeneration data being generated in a user interface. The user interface can also or instead be used to order a "job" for a particular component (e.g., the perception component, the prediction component, the planning component, and so on). As described in FIGS. 1-4 and elsewhere, the computing system can include various components to initiate a job, name a job, associate a job with one or more vehicle computing device components, generate a dataset, and/or determine data for storage.

In some examples, the user interface can receive input information associated with one or more of: a start date, an end date, a dataset, a component name, and/or a version (or build) name, and initiate a regeneration job that is indicative of regeneration data associated with the input information. In various examples, the user interface can provide visibility to one or more engineering teams to indicate which jobs are pending, completed, and/or deleted. The user interface can also provide functionality to receive an input identifying regenerated data that should not be deleted. That is, "caching" regeneration data is often limited by an amount of available storage data, and in some instances, data that is valuable to use at later time can be saved rather than deleted after a specific amount of time (e.g., rather than be deleted after 30 days, after a new version of data is created, or the like).

In various examples, the computing system can organize data for communication with a central pipeline such as a machine learning pipeline processor (e.g., a cloud based service with parallel processing that charges for an amount of data to be processed). Thus, the computing system can be used to save money that may otherwise be spent to process data by the machine learning pipeline processor such as when another team already ordered a similar job (e.g., some log files can be shared). The computing system may also or instead cause a user to save money by formatting the log data with visibility to an overall cost to be charged by the pipeline processor. Further description of the user interface can be found throughout this disclosure, including tin FIG. 5.

In various examples, the data management techniques described herein can include the computing system determining a standard format for training data usable by various components, storing data in a local and/or remote file store, enabling sharing of data among two or more components, and/or determining standard scripts for generating data usable by various components. For example, the computing system can save training data in a common format to enable improved access to the data by multiple users. By storing data in a standard format, access by users responsible for training different components can be made in less time versus not implementing these management techniques. Further, scripts for sending data to a central processing pipeline can be standardized by the computing system to cause the central processing pipeline to process the data in less time and/or to enable more efficient processing and storage of the data.

In some examples, data output from the computing system can be used to modify one or more settings or parameters associated with a perception component, a prediction component, or a planning component (or other components) of a vehicle computing device that controls the vehicle. In this way, objects detected by the vehicle computing device, predictions such as a vehicle trajectory, and/or an object trajectory can be determined with more accuracy versus not implementing the computing system.

As described herein, the computing system may implement one or more machine learned models, statistical models, or a combination thereof. That is, the computing system may utilize a machine learning model that learns from a training data set to improve accuracy of an output (e.g., a prediction). Additionally or alternatively, the computing system may utilize a statistical model that is representative of logic and/or mathematical functions that generate approximations which are usable to make predictions.

The techniques discussed herein can improve a functioning of a computing device of a vehicle in a number of ways. For example, the computing system may output training data for a version of a component to improve prediction related to behavior of the vehicle. In some examples, the computing system may improve functioning and safety of the vehicle by identifying components that, once trained, improve perception, prediction, and/or planning operations which can ultimately lead to safer performance of the vehicle. Further, an output from the computing system can be stored and used at a later time to save an amount of memory resources and/or computational resources required to generate training data for a component. In addition, the techniques described herein can improve passenger comfort and/or vehicle safety such as, for example, avoiding sudden braking or swerving when not needed by improving operation of vision, lidar, and/or radar sensors used to perceive an environment. Utilizing regeneration data by components of a vehicle computing device, for instance, can improve the accuracy and/or reduce a latency for the vehicle to respond to a potential intersection with an object in the environment.

As described herein, the techniques can improve processing by a computing system by determining a format, script, and/or storage location that improves how data (e.g., regeneration data, log data, training data, etc.) is shared among components of a vehicle computing device. Thus, users of the computing system can gain efficiencies while training the various components, even when users are unaware of the training techniques implemented by other users or the computing system. In some examples, training of a downstream component can be done automatically and without user input based at least in part on receiving log data associated with a vehicle.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100 in which an example computing system generates training data associated with an example component. For instance, a computing device associated with an autonomous vehicle (vehicle 102) can exchange data with a computing system 104 that generates and stores training data for one or more components associated with the autonomous vehicle. In some examples, an autonomous vehicle (vehicle 102) can navigate in the environment 100 to a destination while in other examples the environment 100 can represent a simulated environment to test the safety of the vehicle 102.

In various examples, a vehicle computing device (e.g., vehicle computing device 604) and/or a remote computing device (e.g., computing device(s) 632) can include a perception component 106 (e.g., the perception component 622), a prediction component 108 (e.g., the prediction component 624), and a planning component 110 (e.g., the planning component 626), each of which is associated with a particular version. As shown in FIG. 1, the perception component 106 is associated with version X and can receive log data 112 representing one or more of: sensor data, simulation data, passenger data, a vehicle trajectory, and object trajectory, map data, route data, calibration data, perception data, teleoperation data, and/or traffic data. In some examples, the log data 112 can represent data captured by a sensor in an environment (e.g., a sensor coupled to a fixed location, a moving object, an autonomous controller, a vehicle, etc.). FIG. 1 also shows arrows to indicate that data 114 from the perception component 106 is fed to the prediction component 108 version 1 which in turn feeds data 116 to the planning component 110 version Y (and therefore related). Accordingly, the prediction component 108 and the planning component 110 are considered to be downstream from the perception component 106.

In some examples, when an upstream component such as the perception component 106 receives the log data 112, the computing system 104 can generate the data 114 to train the perception component 106. In some examples, the computing system 104 can also or instead cause the data 114 to be input into the prediction component 108 version 1 which outputs the data 116 usable to train the prediction component 108. The data 116 may also or instead be input into the planning component 110 to generate data 118 usable to train the planning component 110. In either case, the computing system 104 can store the generated data 114, the generated data 116, and/or the generated data 118 in a file store or other memory location. In this way, when training data for an upstream component is generated, the computing system 104 can automatically and without user input generate training data for other downstream components (e.g., cause the prediction component 108 version 1 to be trained using the data 116 and/or the planning component 110 version Y to be trained using the data 118). In such a hierarchal relationship, a downstream component may have a higher version (e.g., the planning component version Y is higher than the perception component version X) without requiring the upstream component (e.g., the perception component version X) to be updated to a later version. However, in some examples, an upstream component affected by training of a downstream component can be trained or retrained based at least in part on the hierarchy accessed by the computing system identifying that the upstream component is affected by the training of the downstream component (e.g., such as the planning component causing the perception component or the prediction component to be trained).

As shown in FIG. 1, the data 116 can be used to train the prediction component 108 version 1 which results in a subsequent version shown as prediction component 120 version 2. Thus, the data 116 can in such examples be referred to as training data (or in expels when the data 116 is not used for training the prediction component 108 version 1 can be referred to as component data or file version data). Because the data 114 was fed into the prediction component 108 version 1, the data 116 can be used to update the version of the prediction component as version 2. In some examples, the data 118 can be used to train or otherwise update the version of the planning component 110 version Y to version Z (independent of whether the prediction component 108 version 1 is trained).

After training the prediction component 120 to version 2, the computing system 104 can cause, in various examples, data 122 output by the prediction component 120 version 2 to be input into the planning component 110 version Y (since the planning component 110 version Y was not trained on the data 118). In such examples, the planning component 110 version Y can be trained or otherwise updated to version Z based on data 124 thereby retraining 126 the planning component 110 version Y. In other words, the planning component 110 version Y remains version Y until trained by one of: the data 118 or the data 124, and the computing system 202 can determine which data to use for training, and when to train the planning component 110 version Y.

In some examples, the prediction component 108 can receive updated log data (not shown) which can result in the computing system 104 regenerating training data for the prediction component 120 version 2 and/or the planning component 110 version Y (if not already trained on the data 118 and/or the data 122). By implementing the computing system 104, training data (e.g., the training data 114, the training data 116, the training data 118, and/or the training data 122) can be stored and available for one or more teams responsible to train a respective component. Thus, instead of managing training for each component separately based on requests from a team responsible for each individual component, the computing system 104 can automatically train downstream components based on a single request to train an upstream component (e.g., a request to train the prediction component 120 version 2 can result in retraining 126 the planning component 110 version Y). In some examples, the planning component 110 can be retrained 126 continuously as new log data is received without requiring the upstream components (the perception component 106 and the prediction component 120) to be trained. Further description of generating training data can be found throughout this disclosure including in FIGS. 2-6.

Though FIG. 1 shows the perception component 106, the prediction component 108, and the planning component 110 as examples components additional or different components may also be associated with the computing system 104. In some examples, each component may receive different types of log data from separate pipelines or sources and can also or instead be associated with multiple components. For instance, the perception component 106 may receive the log data 112 from each of a lidar pipeline, a radar pipeline, a vision pipeline, a time of flight pipeline, an ultrasounds pipeline, just to name a few (e.g., the perception component 106 may have multiple subcomponents having a hierarchy unique to the perception component 106). The computing system 104 may also or instead receive the log data 112 from a safety system separate from a vehicle computing system (e.g., a secondary safety system that operates on the vehicle 102 to validate operation of the primary system and to control the vehicle 102 to avoid collisions). In such examples, the safety system may also receive data from each of the aforementioned pipelines and/or subcomponents. By implementing the computing system 104, training data can be determined regardless of the complexity of the architecture used to control the vehicle (separate pipelines to each component, a safety system, and so on).

Further, the computing system 104 may also receive data as input from additional or separate pipelines associated with vehicle health, road network tracking, ride booking (e.g., using the vehicle as a service), etc. Additionally or in the alternative, the computing system 104 can receive the log data 112 from a sensor in an environment that is not coupled to the vehicle 102 such as a sensor associated with an object, another vehicle, a wearable sensor, etc. in the environment.

As described herein, a hierarchy of components can refer to any number of components that are interdependent (e.g., an output of the component is affected by an input and/or an output of an upstream component). Thus, while FIG. 1 shows three different components associated with a vehicle computing device, the computing system 104 can determine data for additional upstream and/or downstream components not shown and therefore be able to handle training, storing, generating, and/or deleting of data in a more complex architecture or system than the example shown in FIG. 1.

Figure 2:
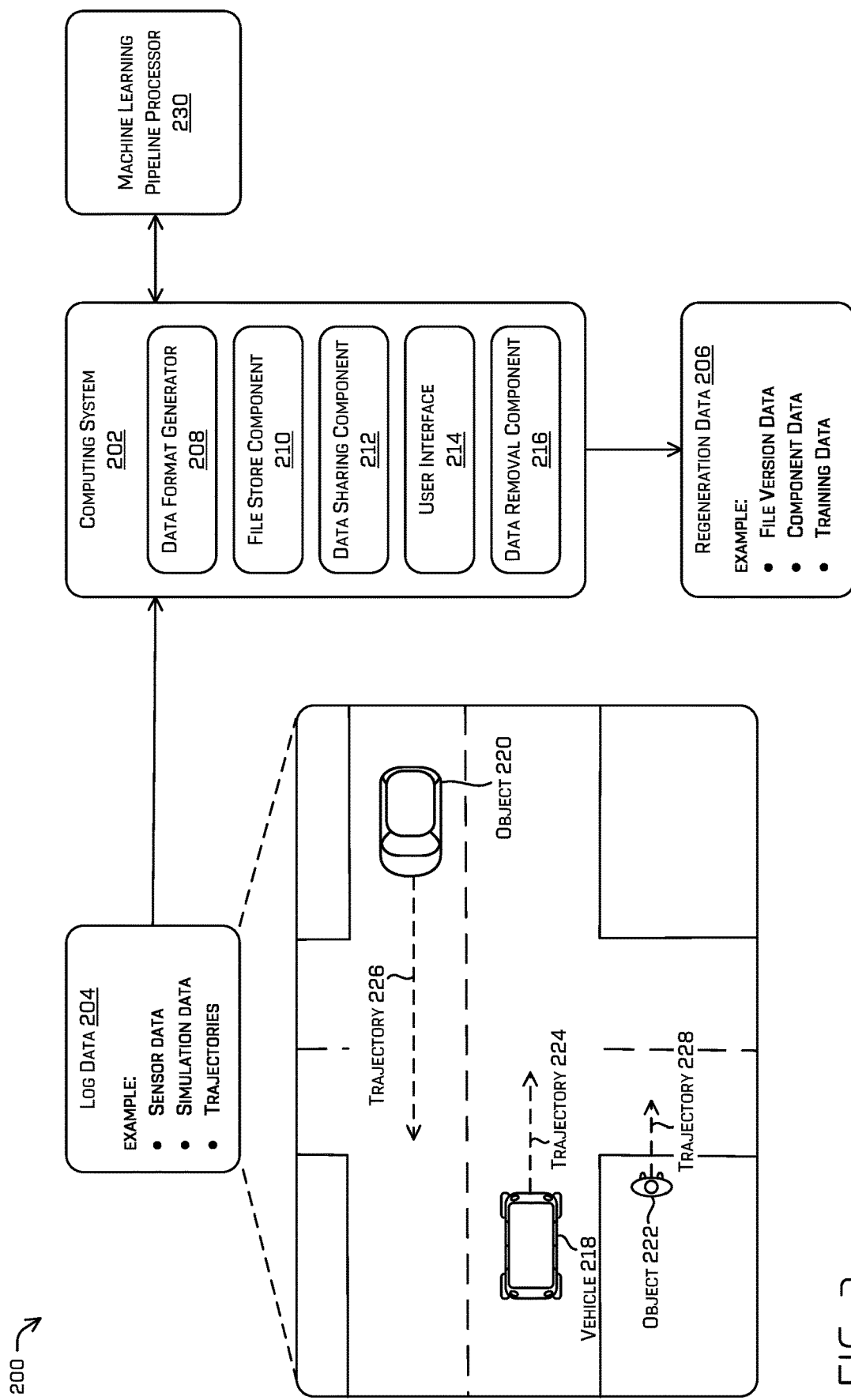
FIG. 2 is an illustration of an example environment in which an example computing system determines regeneration data for one or more components associated with an example vehicle computing device.

FIG. 2 is an illustration of an example environment 200 in which an example computing system determines regeneration data for one or more components associated with an example vehicle computing device. For example, the computing system 202 can include at least the functionality of the computing system 104 of FIG. 1. Generally, the computing system 202 receives log data 204 and outputs regeneration data 206 representing one or more of: file version data, component data, and/or training data. To determine the regeneration data 206, the computing system 202 can implement one or more of a data format generator 208, a file store component 210, a data sharing component 212, a user interface 214, and/or a data removal component 216.

The log data 204 can represent data similar to the log data 112 of FIG. 1 and may also or instead represent a real-world environment in which a vehicle 218 (e.g., an autonomous vehicle such as the vehicle 602) navigates to a destination or a simulated environment in which the vehicle 218 is included in a simulation. The log data 204 may also or instead be associated with subsystems that monitor vehicle health (e.g., operation of the drive system, braking system, battery system, and the like), passenger comfort, and/or ride service applications, just to name a few.

The log data 204 can, in some examples, include sensor data representing object(s) of the environment 200 associated with one or more sensors of the vehicle 218. For example, a vehicle computing device of the vehicle 218 can be configured to receive the sensor data over time and/or in real-time such as via a perception component (e.g., the perception component 622). The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle 218. As yet another example, the objects may be detected based on sensor data received from remote sensors, such as, for example, sensors associated with another vehicle or sensors situated in the environment that are configured to share data with a plurality of vehicles. In various examples, the vehicle 218 may be configured to transmit and/or receive sensor data from other autonomous vehicles. Sensor data representing the detected objects may be used to determine the log data 204 usable by the computing system 202 to determine the regeneration data 206. In some examples, log data 204 can be generated vis simulations in which, for example, a simulated or real autonomous vehicle traverses a simulated environment and/or senses simulated objects.

In some examples, the vehicle computing device may be configured to detect an object in the environment 200, such the object 220 (another vehicle) and object 222 (e.g., a pedestrian). In some examples, the vehicle computing device may be configured to receive, detect, infer, estimate, or otherwise determine one or more paths for the vehicle 218 and/or each detected object. As shown in FIG. 2, the vehicle 218 is associated with a trajectory 224 (e.g., direction, speed, acceleration, etc.), the object 220 is associated with a trajectory 226, and the object 222 is associated with a trajectory 228 determined by the vehicle computing device (e.g., using one or more components). In some examples, the computing system 202 may receive path information associated with the trajectories 224, 226, and/or 228 as part of the log data 204.

The vehicle computing device may estimate positions of the object(s) in the environment based on a detected trajectory and/or predicted trajectories associated with the object(s). In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, a machine learned model may utilize machine learning, linear or signal temporal logic, tree search methods, heat maps, and/or other techniques for determining predicted trajectories and/or estimated positions of object(s).

As mentioned above, the log data 204 can also or instead be simulation data (e.g., data associated with a simulation performed by a computing device to test safety of the vehicle 218). In various examples, the computing system 202 can determine the regeneration data 206 based at least in part on top-down multi-channel data indicative of a top-down representation of an environment. The top-down representation may be determined based at least in part on map data and/or sensor data captured from or associated with a sensor of the vehicle 218 in the environment 200, and may represent a top-down view of the environment to capture context of the vehicle 218 (e.g., identify actions of other objects such the vehicle 218 and the pedestrian 222 relative to the vehicle).

In some examples, the log data 204 can represent data output over time by one or more of: a localization component (e.g., the localization component 620), a perception component (e.g., the perception component 622), a prediction component (e.g., the prediction component 624), and a planning component (e.g., the planning component 626), though other components or data sources are also contemplated. In various examples, the log data 204 received by the computing system 202 may represent object state data (e.g., position data, orientation data, heading data, velocity data, speed data, acceleration data, yaw rate data, or turning rate data associated with the object) and/or vehicle state data (e.g., position data, orientation data, heading data, velocity data, speed data, acceleration data, yaw rate data, or turning rate data associated with the vehicle). The log data 204 may also include, in some examples, two-dimensional image data (e.g., top-down multi-channel "image" data indicative of a top-down representation of an environment) or three-dimensional image data that includes bounding box(es) to represent object(s) in the environment 200.

The regeneration data 206 output by the computing system 202 can include file version data for a particular component of the vehicle computing device and/or an autonomous controller configured to control a machine, such as a vehicle. Each version of a component can represent a current dataset usable by the component to generate an output. Downstream components in a hierarchy of components can receive new data as an input from an upstream component, and output data which can be referred also as component data. In some examples, the data output by the component can be used to train the component (e.g., training data) while in other examples the data output by the component may be used as input to a downstream component that is to be trained. Thus, in various examples, the regeneration data 206 can include training data to train one or more components to improve accuracy of an output by a respective component.

Generally, the regeneration data 206 can represent data associated with a component that changes based on the log data 204 that is used as input. In other words, new log data can be captured by one or more sensors coupled to the vehicle 102 (or other sensors), and generally remains unchanged to represent data captured for a period of time, whereas the regeneration data 206 can change over time. For example, each time a component is fed new input data (e.g., either the log data 112 or data output from another component that received the log data 112), a component generates new output data that can also be referred to as regeneration data 206. As mentioned above, the regeneration data 206 can change over time to reflect changes to the data input into a particular component. Referring back to FIG. 1, the data 114, the data 116, the data 118, the data 122, and the data 124 can all be referred to as regeneration data because the output of the respective component changes over time unlike the log data 112 and the log data 204 which remain unchanged to represent a point in time or a period of time.

The data format generator 208 can provide functionality to format the log data 204 for processing by one or more components of the computing system 202 and/or by a machine learning pipeline processor 230 (e.g., a cloud-based service with parallel processing that processes data). Formatting the log data 204 can include associating the logs with a component, a timeframe, a version of a component, and so on. Formatting the log data 204 may also or instead refer to generating a script for sending the log data 204 to a machine learning pipeline. In some examples, the formatted log data may be used by a machine learned model local to the computing system 202 to train one or more components (in addition to or separate from the machine learning pipeline processor 230). In various examples, the computing system 202 can generate a same format or script type for components in the hierarchy of components. Further discussion of formatting log data can be found throughout this disclosure, including in FIG. 3.

The file store component 210 can provide functionality to store the log data 204 and/or the regeneration data 206. The file store component 210 can comprise, in various examples, a file store, a memory, a database local to the computing system 202, a cloud database, and the like. An amount of storage available to the file store component 210 is limited therefore by implementing the computing system 202 storage of data can be managed to maximize efficiency of available storage. For instance, the computing system 202 can determine whether log data and/or training data associated with a component is already stored and/or available for use for training a same or different component, thereby saving available storage capacity. In some examples, the file store component 210 can store the log data 204 and/or the regeneration data 206 in accordance with a file system root naming convention, one example including x3:cache-pc. For instance, the regeneration data 206 can be associated with a log, component, and version so the exact same regeneration data 206 cannot be inadvertently generated across different file systems (such as by a result of a subsequent job request). In this way, the computing system 202 can act as a root file system that uniquely identifies a job, log data, and/or regeneration data using a naming convention for the regeneration data 206 (can point to the data if it has been generated based on the log, component, and version being associated with the log data 204) to avoid duplicating the regeneration of alike data.

The data sharing component 212 can provide functionality to share the log data 204 and/or the regeneration data 206 with different components of a vehicle computing device and/or an autonomous controller. In examples when the computing system 202 identifies a hierarchical relationship among different components, the data sharing component 212 can output data usable by an upstream component and/or a downstream component for processing. In this way, the data sharing component 212 can cause training data to be generated for a downstream component independent of receiving a request for the training data (such as based on a request for training an upstream component). By implementing the data sharing component 212 current version data, component data, and/or training data can be provided to various components to ensure that the components operate at an optimum level (as opposed to operating on older data).

The computing system 202 may also comprise, in various examples, the user interface 214 to receive job requests (e.g., a request for training data), to indicate where training data is stored (such as via a link), and/or to output controls usable to identify which training data should not be deleted, just to name a few. The user interface 214 can, for example, include controls to receive information such as a start time, an end time, a dataset, a component type, a build, or other information usable to initiate a request for training data for a particular component. The user interface 214 may also or instead provide an indication on a display device indicating a status of the job request such as whether the job request for training data is complete, incomplete, or deleted. Due to a size of some job requests, processing the formatted log data by the machine learning pipeline processor 230 may take days or weeks, for instance. In some examples the user interface 214 may output an expected cost to process the formatted log data in addition to a current job status. By outputting the cost, a user interacting with the user interface 214 may decide to include more or less log data (or a different start time and/or end time) to meet a timing objective and/or cost objective. Further description of the example user interface can be found throughout this disclosure, including in FIG. 5.

The data removal component 216 can provide functionality to determine when to delete data associated with the computing system 202. For example, the data removal component 216 can automatically delete data from the file store component 210 after a particular amount of time (e.g., every 30 days) and/or as new log data is received that updates previously received log data. In some examples, the data removal component 216 can receive data indicating an instruction from the user interface 214 that certain training data and/or log data should not be deleted from the file store component 210.

In some examples, the data removal component 216 can compare data associated with different timeframes and determines, based at least in part on the comparison, to delete or retain the data. For examples, the data removal component 216 can compare a first timeframe of log data to a second timeframe of log data or regeneration data, and delete an earlier version of the log data or the regeneration data to retain the most up to date data for access or processing by the computing system 202.

The regeneration data 206 output by the computing system 202 can be used by a vehicle computing device in a variety of ways. In some examples, a vehicle computing device may control the vehicle 218 in the environment 200 based at least in part on the regeneration data 206 (e.g., determine an action to avoid the objects 220 and/or 222 in the environment). For instance, the regeneration data 206 may be used to update one or more components of the vehicle computing device to cause the vehicle 218 to avoid an intersection with the object 220, to change a setting or parameter associated with a sensor of the perception component, to improve determinations or predictions regarding a location, a trajectory, and the like of the vehicle 218 and/or the objects in the environment 200. Accordingly, the regeneration data 206 may be taken into account in operations (e.g., simulations, estimated states, interaction modeling, collision estimation, etc.) or other vehicle control planning operation (e.g., determine a vehicle trajectory and/or control a propulsion system, a braking system, or a steering system by a planning component) to quickly and/or preemptively avoid objects, thereby improving safety of the vehicle. Additional detail for determining and utilizing the regeneration data 206 are discussed throughout this disclosure.

In various examples, the log data 204, updated log data (log data received at a later time than the log data 204), and/or the regeneration data 206 can be sent by the computing system 202 to a vehicle computing device configured to control the vehicle as it traverses in an environment. For example, data determined by the computing system 202 can be sent for use by one or more components of the vehicle computing device to enable the vehicle to take actions relative to one or more objects in the environment.

A training component of a computing device, such as the computing device(s) 632 (not shown) and/or the vehicle computing device 604 (not shown) may be implemented to train the components associated with the log data 204. Training data may include a wide variety of data, such as data output by a component, image data, video data, lidar data, radar data, audio data, other sensor data, etc., that is associated with a value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications.

Figure 3:
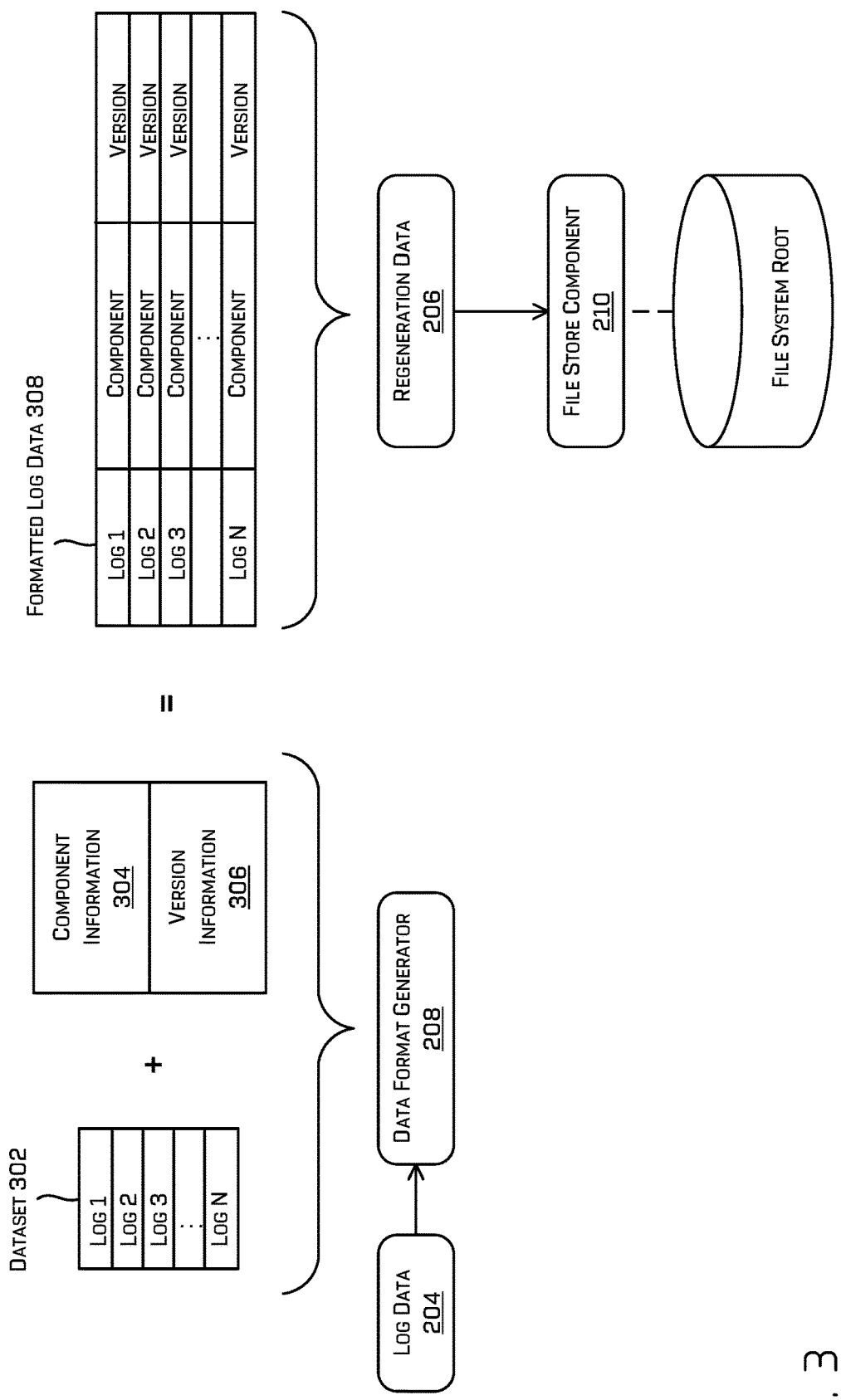
FIG. 3 is an illustration of an example data format generator and an example file store component of an example computing system that determines and stores regeneration data.

FIG. 3 is an illustration of an example data format generator and an example file store component of an example computing system that determines and stores regeneration data. For instance, the computing system 202 can implement the data format generator 208 to receive the log data 204 and generate the regeneration data 206.

As shown in FIG. 3, the log data 204 can include a dataset 302 comprising any number of log files associated with component information 304 and version information 306. In some examples, the data format generator 208 can format the log data 204 by combining information associated with the dataset 302, the component information 304, and the version information 306. The dataset 302 can include log files represented by Log 1, Log 2, Log 3 up to Log N where N is an integer. Each log file can include a start time, an end time, and an identifier usable to access the log file from memory.

In various examples, the dataset 302, the component information 304, and the version information 306 can be determined based at least in part on an input received via the user interface 214 indicating a "job" request for training data. For example, the dataset 302 can be accessed, compiled, or otherwise determined based on a user inputting a range of time for which log files are desired. The log files may be associated with a component of a vehicle computing device, and the component 304 may be determined based on input by the user to the user interface 214. The version information 306 can be determined by the data format generator 208 as a next value from a previously stored version of the component and/or by a value input into the user interface 214. When combined, formatted log data 308 can identify the dataset 302, the component information 304, and the version information 306 (e.g., a build) for which to determine the regeneration data 206. The formatted log data 308 can represent a name of the log data 204 and can be human readable to convey the component, version, and other information, and may be used to enable access by a human accessing the computing system 202. In some examples, the component information 304 and the version information 306 can be used to index the log data 204 and/or the dataset 302 to generate the formatted log data 308. The data format generator 208 can, in various examples, generate the formatted log data 308 to represent the log data 204 as a uniform resource identifier (URI) that identifies a location of the regeneration data 206.

In some examples, the regeneration data 206 can be stored in the file store component 210 in accordance with a file system root naming convention, one example including x3:cache-pc. For instance, the regeneration data 206 can be associated with a log, component, and version based on the formatted log data 308, so the exact same regeneration data 206 cannot be generated across different file systems. In this way, the computing system 202 can act as a root file system that uniquely identifies a job using the regeneration data 206 (can point to the data if it has been generated based on the log, component, and version being associated with the log data 204) to avoid duplicating the regeneration of alike data.

Figure 4:
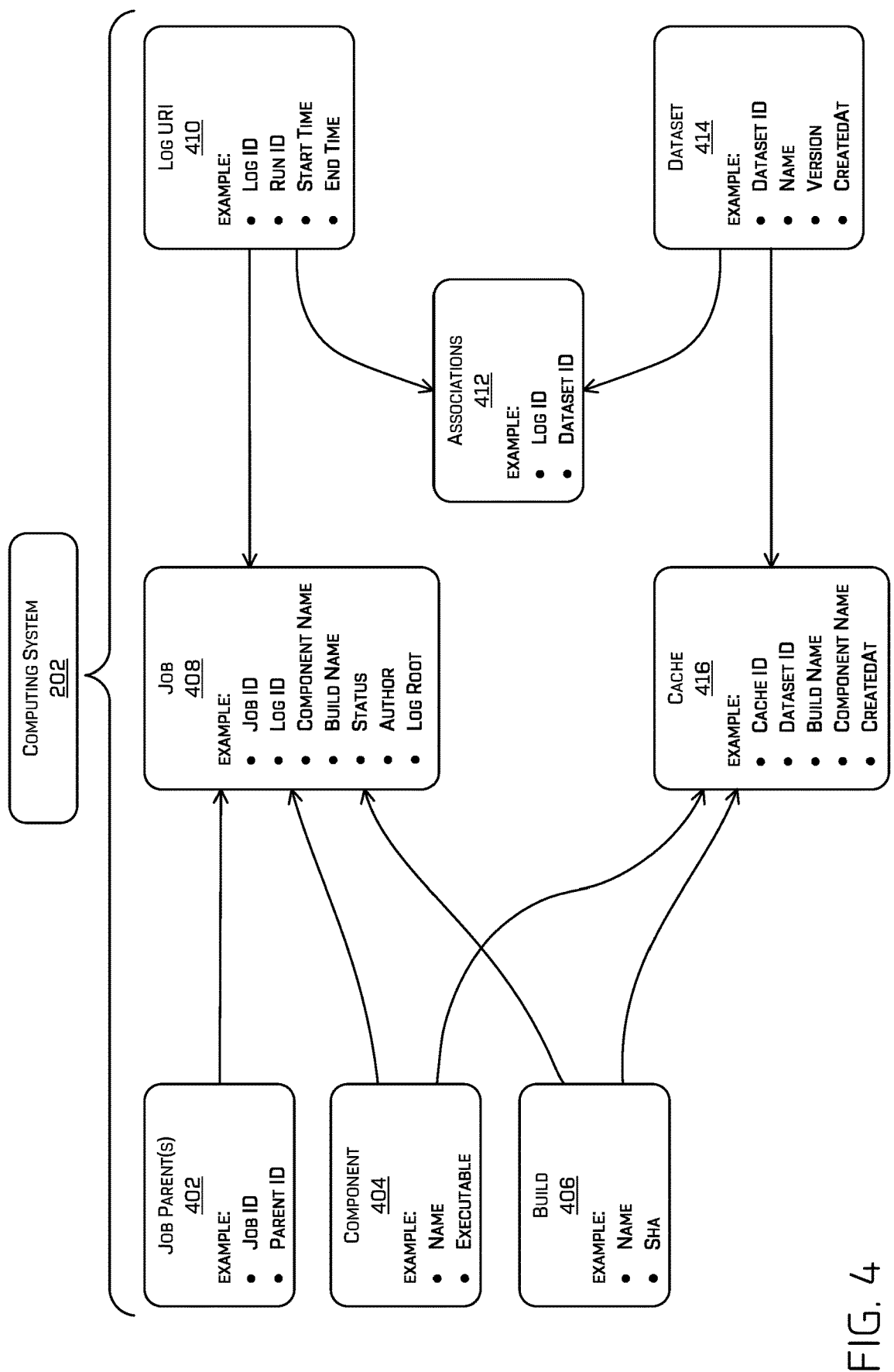
FIG. 4 is an illustration of an example computing system usable to implement the techniques described herein.

FIG. 4 is an illustration of an example computing system usable to implement the data management techniques described herein. As shown in FIG. 4, the computing system 202 can be configured to with multiple tables or other data structures such as job parent(s) 402, component 404, build 406, job 408, log uniform resource identifier (URI) 410, associations 412, dataset 414, and cache 416 to act as a relational database. By exchanging data between these tables, the computing system 202 can process the log data 204 to generate, store, and/or delete the regeneration data 206. In some examples, the example tables in FIG. 4 can provide functionality to operate as an application program interface (API).

The job parent(s) 402 represents a table of data such as a job identification and a parent identification that identifies relationships between components in a hierarchy of components. For example, the job parent(s) 402 can store data to identify a prediction component as being upstream from a planning component, and a perception component being upstream from the prediction component. In some examples, the job parent(s) 402 can identify multiple components related to a component for which a job request for training data has been submitted, and share the information with other tables or data structures to determine relationships between the multiple components.

Another table of the computing system 202 includes the component 404 table that stores data associated with a component name and executable type (e.g., an executable file). The build 406 represents a table with information describing a name of a version of a component and a hash value usable with a Git workflow, for example. In some examples, a request for training data associated with a job request can access the job identifier, the parent identifier(s), the component name and executable, the version name and hash value, and share the information with a job 408 table that compiles information along with an author of the associated job request, a location of the logs (e.g., log root(s)), and then determine a status of the job.

Details about each log file can be stored in a log URI 410 table which comprises information such as a log identifier, a run identifier, a start time (e.g., a first time), and an end time (e.g., a second time). The associations 412 represents a table that associates log files used in a dataset by storing log identifiers and dataset identifiers. The dataset 414 represents a table that represents a collection of log files and stores a dataset identifier, a name, a version, and a date and time the dataset was created (shown as CreatedAt in FIG. 4). The cache 416 represents, for example, a table that includes information about how a job is stored in a datastore or memory, and includes a cache identifier, a dataset identifier, a build name, a component name, and the date and time the dataset was created.

Collectively, the tables shown in FIG. 4 represent a design or configuration of the computing system 202 that enables efficient management of the log data 204 and the regeneration data 206. For instance, by organizing the tables to access data as shown in FIG. 4, the computing system 202 can determine a standard format for training data usable by various components, store data in a local file store and/or a remote file store, enable sharing of data among two or more components, and/or determine standard scripts for generating data usable by the two or more components.

Figure 5:
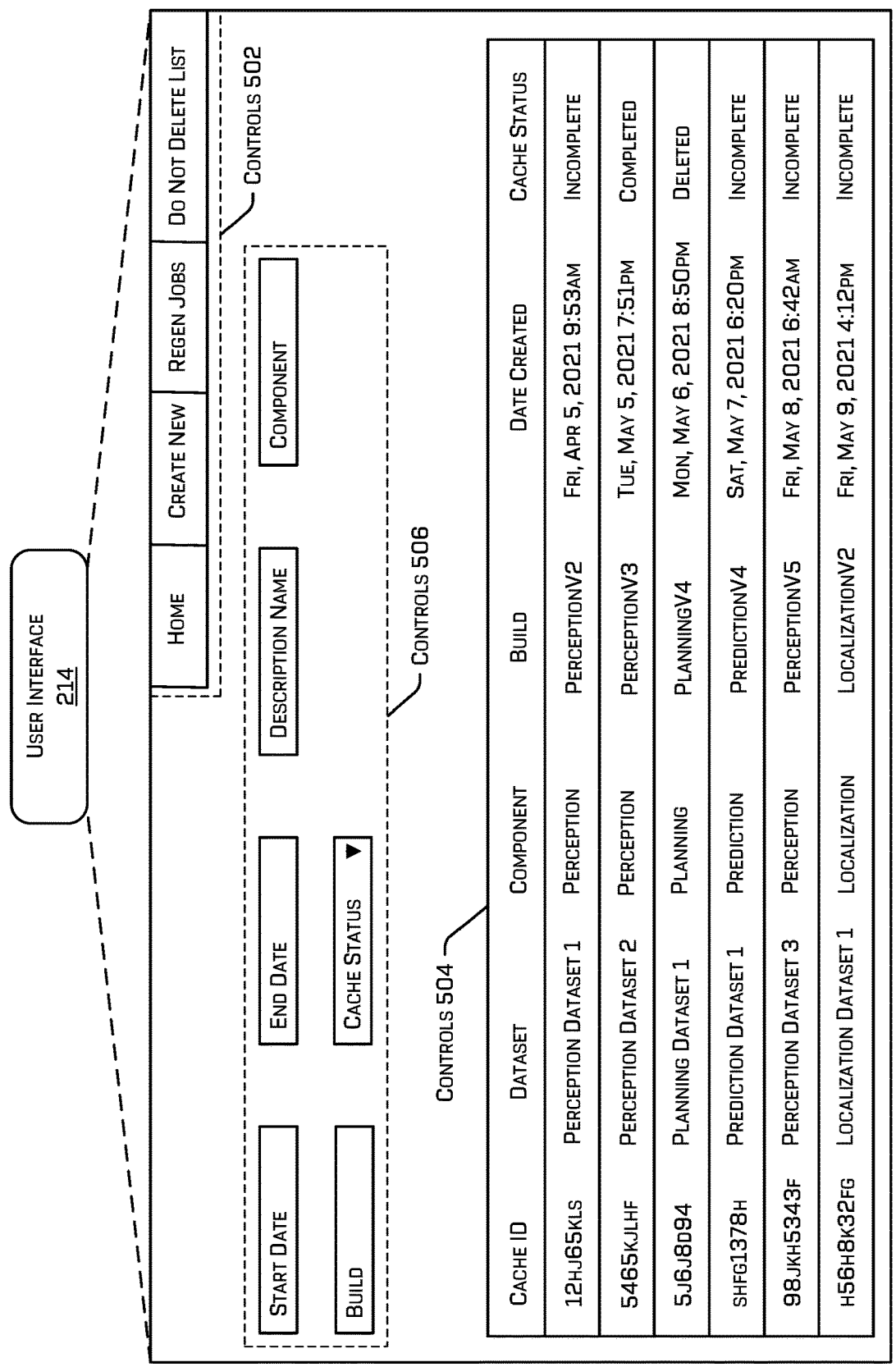
FIG. 5 is an illustration of an example user interface of an example computing system usable to implement the techniques described herein.

FIG. 5 is an illustration of an example user interface of an example computing system usable to implement the techniques described herein. For example, the user interface 214 of the computing system 202 can be used to initiate a job request for training data, review previously generated jobs, delete a job, check status of the job, and so on.

In some examples, controls 502 can include selectable controls to access a homepage, create a new job, access a page of previously generated data, and/or manage a list of jobs to delete undesired data or to avoid deleting certain data associated with previous training data. As shown in FIG. 5, the controls 504 can include information associated with a cache identifier, a data set, a component, a build, a date created, and/or a cache status for display on a display device.

The user interface 214 can also or instead include controls 506 to initiate a job request for training data for a particular component. In some examples, the controls 506 can include fields for entering information such as a start date, and end date, a description name, a component type, and/or a build (version). In some examples, the description can be entered as a human readable description to represent a dataset name that represents multiple log files (e.g., datasetV0, perception datasetV1, small prediction data V1, etc.) to enable easier access to the multiple log files. Additionally, the controls 506 may include a drop-down menu to indicate a current status of previously entered jobs. Each piece of information associated with the controls 502, the controls 504, and the controls 506 can represent a selectable control that, if selected, opens additional information associated with respective information.

Figure 6:
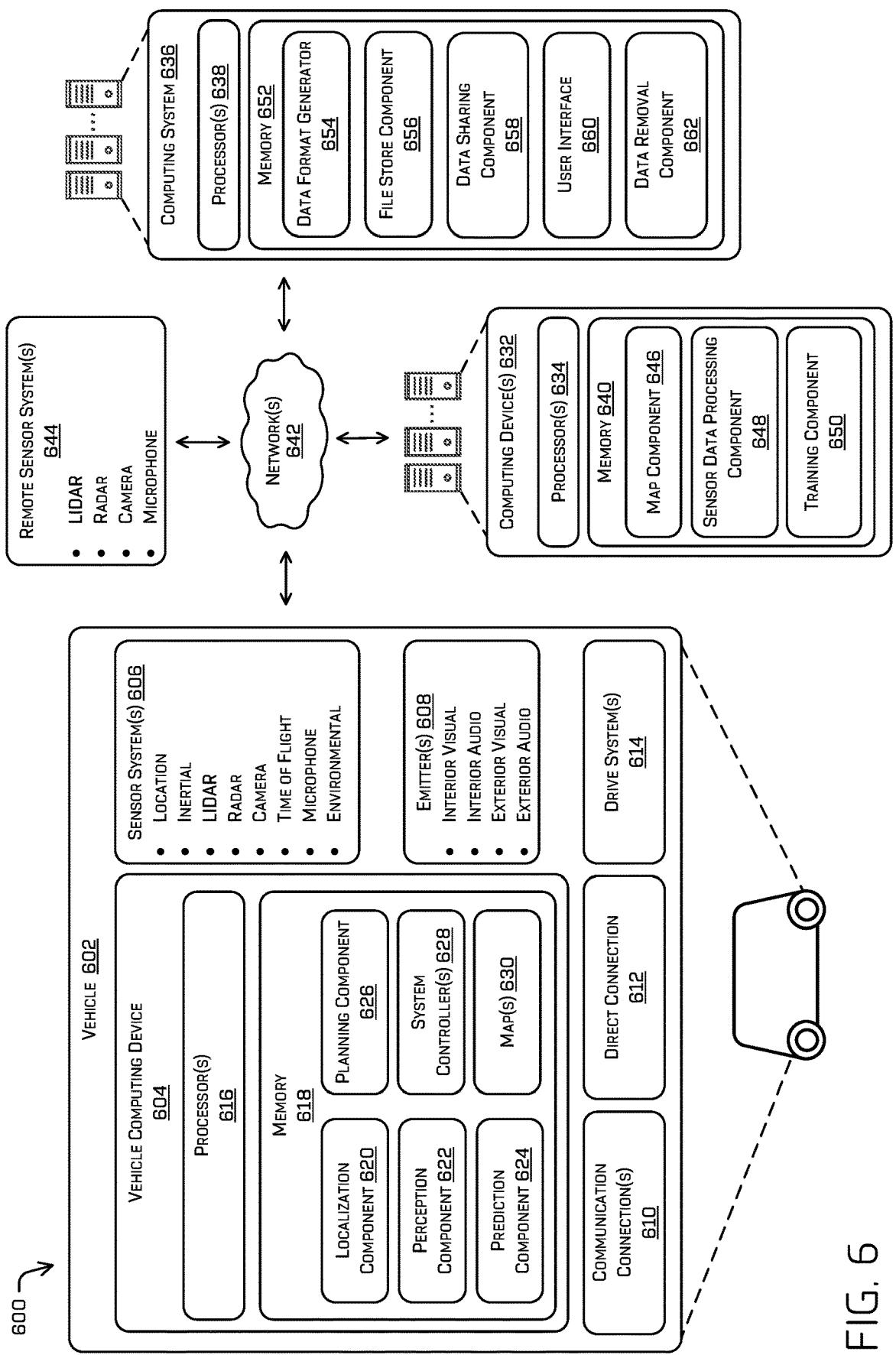
FIG. 6 is a block diagram of an example system for implementing the techniques described herein.

FIG. 6 is a block diagram of an example system 600 for implementing the techniques described herein. In at least one example, the system 600 may include a vehicle, such as vehicle 602.

The vehicle 602 may include a vehicle computing device 604, one or more sensor systems 606, one or more emitters 608, one or more communication connections 610, at least one direct connection 612, and one or more drive system(s) 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In various examples, the vehicle computing device 604 may store sensor data associated with actual location of an object at the end of the set of estimated states (e.g., end of the period of time) and may use this data as training data to train one or more models. In some examples, the vehicle computing device 604 may provide the data to a remote computing device (i.e., computing device separate from vehicle computing device such as the computing device(s) 632) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference for all purposes.

In the illustrated example, the memory 618 of the vehicle computing device 604 stores a localization component 620, a perception component 622, a prediction component 624, a planning component 626, one or more system controllers 628, and one or more maps 630. Though depicted in FIG. 6 as residing in the memory 618 for illustrative purposes, it is contemplated that the localization component 620, the perception component 622, the prediction component 624, the planning component 626, one or more system controllers 628, and/or one or more maps 630 may additionally, or alternatively, be accessible to the vehicle 602 (e.g., stored on, or otherwise accessible by, memory remote from the vehicle 602, such as, for example, on memory 640 of a remote computing device 632).

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630 and/or map component 646, and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 624 can generate one or more probability maps representing prediction probabilities of possible locations of one or more objects in an environment. For example, the prediction component 624 can generate one or more probability maps for vehicles, pedestrians, animals, and the like within a threshold distance from the vehicle 602. In some instances, the prediction component 624 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 624 may generate predicted trajectories of objects (e.g., objects) in an environment and/or to generate predicted candidate trajectories for the vehicle 602. For example, the prediction component 624 may generate one or more predicted trajectories for objects within a threshold distance from the vehicle 602. In some examples, the prediction component 624 may measure a trace of an object and generate a trajectory for the object based on observed and predicted behavior.

In general, the planning component 626 may determine a path for the vehicle 602 to follow to traverse through an environment. For example, the planning component 626 may determine various routes and trajectories and various levels of detail. For example, the planning component 626 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 626 may generate an instruction for guiding the autonomous vehicle along at least a portion of the route from the first location to the second location. In at least one example, the planning component 626 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle.

In other examples, the planning component 626 can alternatively, or additionally, use data from the localization component 620, the perception component 622, and/or the prediction component 624 to determine a path for the vehicle 602 to follow to traverse through an environment. For example, the planning component 626 can receive data from the localization component 620, the perception component 622, and/or the prediction component 624 regarding objects associated with an environment. Using this data, the planning component 626 can determine a route to travel from a first location (e.g., a current location) to a second location (e.g., a target location) to avoid objects in an environment. In at least some examples, such a planning component 626 may determine there is no such collision free path and, in turn, provide a path which brings vehicle 602 to a safe stop avoiding all collisions and/or otherwise mitigating damage.

In at least one example, the vehicle computing device 604 may include one or more system controllers 628, which may be configured to control steering, propulsion, braking, safety, emitters, communication, and other systems of the vehicle 602. The system controller(s) 628 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 624, and/or the planning component 626 to determine a location of the vehicle 602, detect objects in an environment, generate routes, determine actions and/or trajectories to navigate within an environment.

In some examples, the one or more maps 630 may be stored on a remote computing device(s) (such as the computing device(s) 632) accessible via network(s) 642. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

As can be understood, the components discussed herein (e.g., the localization component 620, the perception component 622, the prediction component 624, the planning component 626, the one or more system controllers 628, and/or the one or more maps 630 are described as divided for illustrative purposes. However, the operations performed by the various components may be combined or performed in any other component.

While examples are given in which the techniques described herein are implemented by the vehicle computing device 604, in some examples, some or all of the techniques described herein could be implemented by another system of the vehicle, such as a secondary safety system. Generally, such an architecture can include a first computing device to control the vehicle 602 and a secondary safety system that operates on the vehicle 602 to validate operation of the primary system and to control the vehicle 602 to avoid collisions.

In some instances, aspects of some or all of the components discussed herein may include any models, techniques, and/or machine learned techniques. For example, in some instances, the components in the memory 618 (the memory 640 and the memory 652, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 642, to the one or more computing device(s) 632 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 632, other nearby vehicles, etc.) and/or one or more remote sensor system(s) 644 for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 642. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 624, the planning component 626, the one or more system controllers 628, and the one or more maps 630 may process sensor data, as described above, and may send their respective outputs, over the one or more network(s) 642, to the computing device(s) 632 and/or the computing system 636.

In at least one example, the localization component 620, the perception component 622, the prediction component 624, the planning component 626, the one or more system controllers 628, and the one or more maps 630 may send their respective outputs to the remote computing device(s) 632 and/or the computing system 636 at a particular frequency, after a lapse of a predetermined period of time, in near real-time, etc.

In some examples, the vehicle 602 may send sensor data to the computing device(s) 632 and/or the computing system 636 via the network(s) 642. In some examples, the vehicle 602 may receive sensor data from the computing device(s) 632 and/or remote sensor system(s) 644 via the network(s) 642. The sensor data may include raw sensor data and/or processed sensor data and/or representations of sensor data. In some examples, the sensor data (raw or processed) may be sent and/or received as one or more log files.

The computing device(s) 632 may include processor(s) 634 and a memory 640 storing the map component 646, a sensor data processing component 648, and a training component 650. In some examples, the map component 646 may include functionality to generate maps of various resolutions. In such examples, the map component 646 may send one or more maps to the vehicle computing device 604 for navigational purposes. In various examples, the sensor data processing component 648 may be configured to receive data from one or more remote sensors, such as sensor system(s) 606 and/or remote sensor system(s) 644. In some examples, the sensor data processing component 648 may be configured to process the data and send processed sensor data to the vehicle computing device 604. In some examples, the sensor data processing component 648 may be configured to send raw sensor data to the vehicle computing device 604.

In some instances, the training component 650 can include functionality to train a machine learning model to output vehicle behavior. For example, the training component 650 can receive data such as training data from the computing system 636, log data representative of drive data, and/or sensor data that represents an object traversing through an environment for a period of time, such as 0.1 milliseconds, 1 second, 3, seconds, 5 seconds, 7 seconds, and the like. At least a portion of the data can be used as an input to train the machine learning model.

In some instances, the training component 650 may be executed by the processor(s) 634 to train a machine learning model based on training data. The training data may include a wide variety of data, such as the log data 204, the regenerated data 206, classifier labels, sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 650 can include functionality to train a machine learning model to output classification values. At least a portion of the data can be used as an input to train the machine learning model. Thus, by providing data where the vehicle traverses an environment, the training component 650 can be trained to output classification representing vehicle behavior relative to objects, as discussed herein.

In some examples, the training component 650 can include training data that has been generated by a simulator. For example, simulated training data can represent examples where a vehicle collides with an object in an environment or nearly collides with an object in an environment, to provide additional training examples.

The computing system 636 may include processor(s) 638 and a memory 652 storing a data format generator 654, a file store component 656, a data sharing component 658, a user interface 660, and a data removal component 662. In some examples, the data format generator 654 may include functionality to format log data, such as the log data 204. For instance, the data format generator 654 can provide functionality similar to the data format generator 208 to format the log data 204 for processing by one or more components of the computing system 636, the vehicle computing device 604, and/or by the machine learning pipeline processor 230.

In various examples, the file store component 656 may be configured to store data, such as the log 204 and/or the regenerated data 206, in a file store, a memory (e.g., the memory 652), a database, a cloud-based database, etc. For example, the file store component 656 can determine when and where to store and/or delete data associated with the localization component 620, the perception component 622, the prediction component 624, the planning component 626, the one or more system controllers 628, and/or the one or more maps 630.

In some examples, the data sharing component 658 may be configured to share data between components of the vehicle computing device 604. For instance, the data sharing component 658 can provide functionality to receive, send, and otherwise share data between the perception component 622, the prediction component 624, and/or the planning component 626, just to name a few, and may be configured similar to the data sharing component 212. In some examples, the data sharing component 658 may be configured to share log files, training data, component data, file version data, and other data types between the components based at least in part on accessing a hierarchy of components.

In some examples, the user interface 660 may be configured to provide functionality similar to the user interface 214 including receiving job requests (e.g., a request for training data), determining where training data is to be stored (such as via a link), and/or to outputting controls usable to identify which training data should not be deleted, just to name a few. The user interface 660 can, for instance, provide indications a job status and/or a job cost via a display device associated with one or more teams responsible for training different components.

The data removal component 662 may be configured to provide functionality similar to the data removal component 216 of FIG. 2. For instance, the data removal component 662 can be configured to manage when or whether to delete the regeneration data 206. In various examples, training data may be removed, or marked for saving via the user interface 660, to manage which types of data get deleted at a given time.

The processor(s) 616 of the vehicle 602, the processor(s) 634 of the computing device(s) 632, and the processor(s) 638 of the computing system 536 may be any suitable processor capable of executing instructions to process data and perform operations as described herein. By way of example and not limitation, the processor(s) 616, 634, and 638 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618, memory 640, and memory 652 are examples of non-transitory computer-readable media. The memory 618, the memory 640, and the memory 652 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 632, and/or the computing system 636. Further, the components of the computing device(s) 632 and/or the computing system 636 may be associated with the vehicle 602. That is, the vehicle 602 may perform one or more of the functions associated with the computing device(s) 632 and/or the computing system 636, and vice versa.

Figure 7:
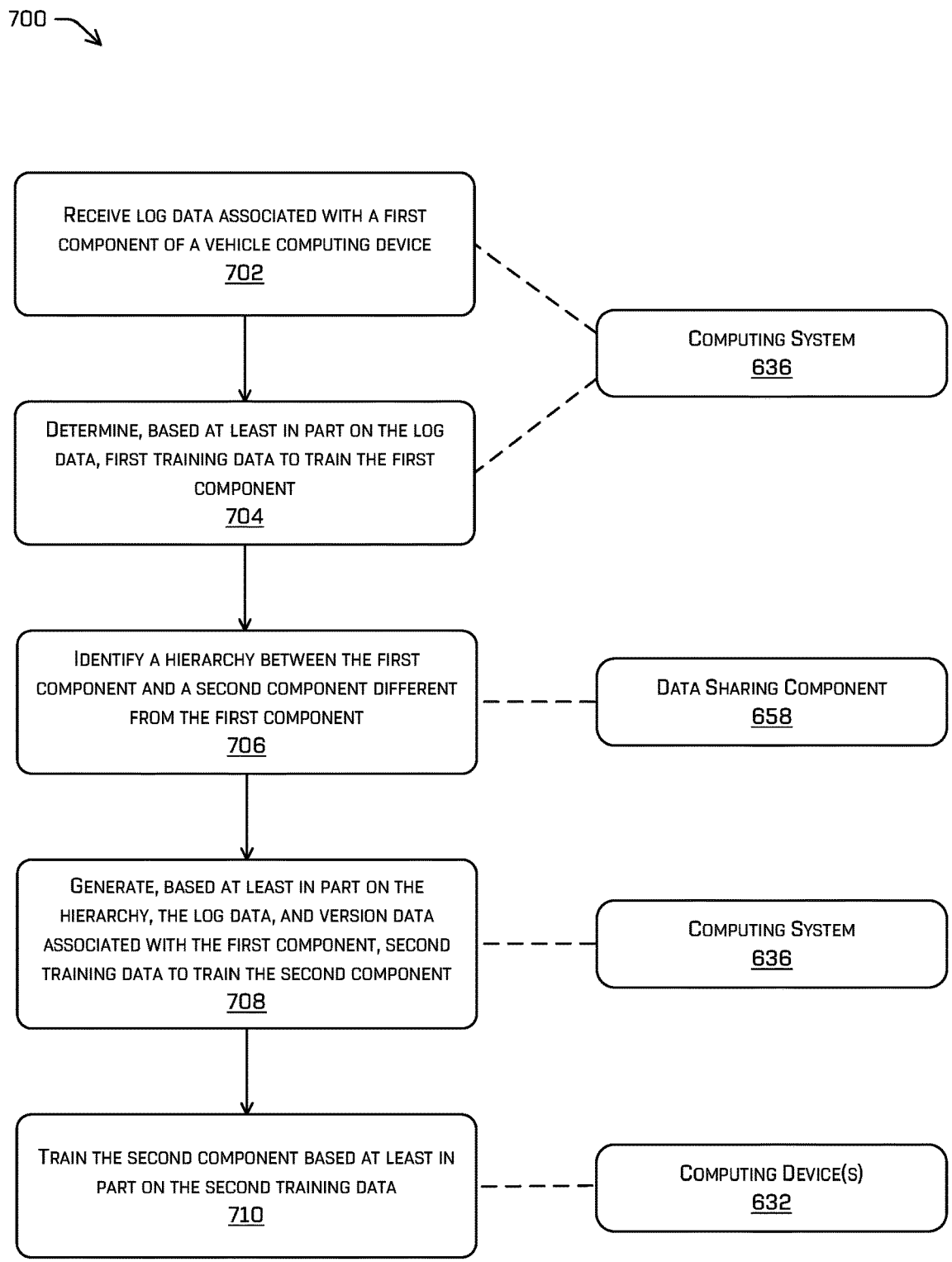
FIG. 7 is a flowchart depicting an example process for determining training data using an example computing system.

FIG. 7 is a flowchart depicting an example process 700 for determining training data using an example central computing system. For example, some or all of the process 700 can be performed by one or more components in FIG. 6, as described herein. For example, some or all of the process 700 can be performed by the vehicle computing device 604, the computing device(s) 632, and/or the computing system 636.

At operation 702, the process may include receiving log data associated with a first component of a vehicle computing device, the log data representing a simulated environment or a real-world environment of a vehicle between a first time and a second time. In some examples, the operation 702 may include a vehicle computing device implementing the perception component 622 to detect objects in an environment of the vehicle 602 and a prediction component 624 to predict a path or action to be taken by the detected object in the future. The log data may be representative of the log data 204, and may include data output by one or more components of the vehicle computing device 604 over a time period. In some examples, the user interface 660 may receive an input to initiate a job request to train the prediction component 624 associated with log data between a first time (e.g., a start time) and a second time (e.g., an end time) after the first time. In various examples, the log data may be associated with simulated log data representing an action (e.g., a braking action, an acceleration action, and/or a steering action, etc.) of the vehicle 602 during a simulation while in other examples the log data may represent an action or behavior of the vehicle 602 during past navigation in a real-world environment.

In some examples, the log data may be associated with sensor data that is processed to determine top-down multi-channel data of the environment including one or more bounding boxes associated with objects in the environment. The sensor data may be received from one or more sensors on the vehicle 602 and/or from one or more remote sensors. In various examples, top-down multi-channel data can comprise object state data associated with the object (e.g., a channel of the top-down multi-channel data can indicate a trajectory of the object).

At operation 704, the process may include determining, based at least in part on the log data, first training data to train the first component. In some examples, the operation 704 may include the computing system 636 determining training data to train the perception component 622 based at least in part on the received log data. The operation 704 may also or instead include the computing system 636 determining training data to train the prediction component 624 and/or planning component 626.

At operation 706, the process may include identifying a hierarchy between the first component and a second component different from the first component. For instance, the computing system 636 may implement the data sharing component 658 to access a hierarchy indicating that training the second component is dependent upon data received from the first component. In some examples, the operation 706 may include the data sharing component 658 identifying the prediction component 624 receives input from the perception component 622 and/or that the planning component 626 receives input data from an output of the prediction component 624. In this way, the data sharing component 658 can identify other downstream components from the perception component 622 which may be affected by the log data and therefore our candidates for training. Additionally, or alternatively, the operation 706 may include the data sharing component 658 accessing one or more tables associated with FIG. 4 to determine current file version data associated with each component in the hierarchy of components.

At operation 708, the process may include generating, based at least in part on the hierarchy, the log data, and version data associated with the first component, second training data to train the second component. In some examples, the operation 708 may include the computing system 636 generating training data for the prediction component 624 and/or the planning component 626. For instance, in examples when the user interface 660 receives a job request to train the prediction component 624, the computing system 636 can generate training data for the planning component 626 (e.g., update the version of the planning component).

At operation 710, the process may include training the second component based at least in part on the second training data. In some examples, the operation 710 may include the computing system 636 training the planning component 626. Training the planning component 626 may include updating weights, parameters, hyperparameters, and the like to change a future output (e.g., a trajectory determination for the vehicle 102) by the planning component 626. In various examples, the operation 710 may be performed independent of whether or not an upstream component, such as the perception component 622, is trained.

In various examples, process 700 may return to 702 after performing operation 710. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIG. 7 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving log data associated with a first component of a vehicle computing device, the log data representing a simulated environment or a real-world environment of a vehicle between a first time and a second time; determining, based at least in part on the log data, first training data to train the first component; identifying a hierarchy between the first component and a second component different from the first component, the hierarchy indicating that training the second component is dependent upon data received from the first component; generating, based at least in part on the hierarchy, the log data, and version data associated with the first component, second training data to train the second component; and training the second component based at least in part on the second training data.

B: The system of paragraph A, wherein the first component is a sensor component of the vehicle computing device and the second component is one of a prediction component or a planning component of the vehicle computing device.

C: The system of paragraph A or B, wherein: the log data is received responsive to an input via a user interface, the log data identifies the vehicle, the first time is a start time, and the second time is an end time.

D: The system of any of paragraphs A-C, the operations further comprising: storing, in a file store, the first training data associated with the first component; receiving updated log data representing data captured by one or more sensors of the vehicle between a third time and a fourth time; regenerating training data to train the first component; and replacing, in the file store, the first training data with the regenerated training.

E: The system of any of paragraphs A-D, the operations further comprising: determining, as a determination, that a third component receives, as an input, an output from the second component; and training, based at least in part on the determination and version data associated with the second component, the third component.

F: A method comprising: receiving data associated with a first component of an autonomous controller; determining, as updated data, an update to the data associated with the first component; generating, based at least in part on determining the update to the data, first training data associated with the first component; determining a relationship between the first component and a second component of the autonomous controller; and training, based at least in part on the relationship, a current version of the first component, and a current version of the second component, the second component.

G: The method of paragraph F, wherein the data is associated with data captured by a sensor in an environment.

H: The method of paragraph F or G, wherein the data comprises simulated data associated with a simulated environment.

I: The method of any of paragraphs F-H, wherein the relationship between the first component and the second component comprises a hierarchy indicating that data from the first component is input into the second component to determine an output by the second component.

J: The method of any of paragraphs F-I, wherein the first component is a sensor component of the autonomous controller and the second component is one of a prediction component or a planning component of the autonomous controller.

K: The method of any of paragraphs F-J, wherein: the data is received responsive to an input via a user interface, and the input specifies a start time and an end time associated with behavior of a machine controlled by the autonomous controller.

L: The method of any of paragraphs F-K, further comprising: replacing, in a file store, the data with the updated data.

M: The method of any of paragraphs F-L, further comprising: comparing, as a comparison, a first timeframe associated with the data with a second timeframe associated with the updated data; and determining, based at least in part on the comparison, to delete the data from a file store.

N: The method of any of paragraphs F-M, further comprising sending the updated data to a vehicle computing device for a vehicle to traverse an environment.

O: The method of any of paragraphs F-N, further comprising: determining that the data is associated with the current version of the first component; and determining that the updated data is associated with another version of the first component, wherein determining the update to the data associated with the first component comprises identifying that the other version occurs after the current version.

P: The method of any of paragraphs F-O, further comprising: generating second training data based at least in part on the relationship between the first component and the second component indicating that the second component receives data from the first component as input; and training the second component based at least in part on the second training data.

Q: One or more non-transitory computer-readable media storing instructions executable by one or more processors, wherein the instructions, when executed, cause the one or more processors to perform operations comprising: receiving data associated with a first component of an autonomous controller; determining, as updated data, an update to the data associated with the first component; generating, based at least in part on determining the update to the data, first training data associated with the first component; determining a relationship between the first component and a second component of the autonomous controller; and training, based at least in part on the relationship, a current version of the first component, and a current version of the second component, the second component.

R: The one or more non-transitory computer-readable media of paragraph Q, wherein the data is associated with data captured by a sensor in an environment.

S: The one or more non-transitory computer-readable media of paragraph Q or R, wherein the relationship between the first component and the second component comprises a hierarchy indicating that data from the first component is input into the second component to determine an output by the second component.

T: The one or more non-transitory computer-readable media of any of paragraphs Q-S, the operations further comprising: determining that the data is associated with the current version of the first component; and determining that the updated data is associated with another version of the first component, wherein determining the update to the data associated with the first component comprises identifying that the other version occurs after the current version.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving log data associated with a first component of a vehicle computing device, the log data representing a simulated environment or a real-world environment of a vehicle between a first time and a second time;
determining, based at least in part on the log data, first training data to train the first component;
identifying a hierarchy between the first component and a second component different from the first component, the hierarchy indicating that training the second component is dependent upon data received from the first component;
generating, based at least in part on the hierarchy, the log data, and version data associated with the first component, second training data to train the second component; and
training the second component based at least in part on the second training data.

2. The system of claim 1, wherein the first component is a sensor component of the vehicle computing device and the second component is one of a prediction component or a planning component of the vehicle computing device.

3. The system of claim 1, wherein:
the log data is received responsive to an input via a user interface,
the log data identifies the vehicle,
the first time is a start time, and
the second time is an end time.

4. The system of claim 1, the operations further comprising:
    storing, in a file store, the first training data associated with the first component;
    receiving updated log data representing data captured by one or more sensors of the vehicle between a third time and a fourth time;
    regenerating training data to train the first component; and
    replacing, in the file store, the first training data with the regenerated training.

5. The system of claim 1, the operations further comprising:
    determining, as a determination, that a third component receives, as an input, an output from the second component; and
    training, based at least in part on the determination and version data associated with the second component, the third component.

6. A method comprising:
    receiving data associated with a first component of an autonomous controller;
    determining, as updated data, an update to the data associated with the first component;
    generating, based at least in part on determining the update to the data, first training data associated with the first component;
    determining a relationship between the first component and a second component of the autonomous controller; and
    training, based at least in part on the relationship, a current version of the first component, and a current version of the second component, the second component.

7. The method of claim 6, wherein the data is associated with data captured by a sensor in an environment.

8. The method of claim 6, wherein the data comprises simulated data associated with a simulated environment.

9. The method of claim 6, wherein the relationship between the first component and the second component comprises a hierarchy indicating that data from the first component is input into the second component to determine an output by the second component.

10. The method of claim 6, wherein the first component is a sensor component of the autonomous controller and the second component is one of a prediction component or a planning component of the autonomous controller.

11. The method of claim 6, wherein:
    the data is received responsive to an input via a user interface, and
    the input specifies a start time and an end time associated with behavior of a machine controlled by the autonomous controller.

12. The method of claim 6, further comprising:
    replacing, in a file store, the data with the updated data.

13. The method of claim 6, further comprising:
    comparing, as a comparison, a first timeframe associated with the data with a second timeframe associated with the updated data; and
    determining, based at least in part on the comparison, to delete the data from a file store.

14. The method of claim 6, further comprising sending the updated data to a vehicle computing device for a vehicle to traverse an environment.

15. The method of claim 6, further comprising:
    determining that the data is associated with the current version of the first component; and
    determining that the updated data is associated with another version of the first component,
    wherein determining the update to the data associated with the first component comprises identifying that the other version occurs after the current version.

16. The method of claim 6, further comprising:
    generating second training data based at least in part on the relationship between the first component and the second component indicating that the second component receives data from the first component as input; and
    training the second component based at least in part on the second training data.

17. One or more non-transitory computer-readable media storing instructions executable by one or more processors, wherein the instructions, when executed, cause the one or more processors to perform operations comprising:
    receiving data associated with a first component of an autonomous controller;
    determining, as updated data, an update to the data associated with the first component;
    generating, based at least in part on determining the update to the data, first training data associated with the first component;
    determining a relationship between the first component and a second component of the autonomous controller; and
    training, based at least in part on the relationship, a current version of the first component, and a current version of the second component, the second component.

18. The one or more non-transitory computer-readable media of claim 17, wherein the data is associated with data captured by a sensor in an environment.

19. The one or more non-transitory computer-readable media of claim 17, wherein the relationship between the first component and the second component comprises a hierarchy indicating that data from the first component is input into the second component to determine an output by the second component.

20. The one or more non-transitory computer-readable media of claim 17, the operations further comprising:
    determining that the data is associated with the current version of the first component; and
    determining that the updated data is associated with another version of the first component,
    wherein determining the update to the data associated with the first component comprises identifying that the other version occurs after the current version.

* * * * *